United States Patent [19]

Sugiyama et al.

[11] Patent Number: 5,684,913

[45] Date of Patent: Nov. 4, 1997

[54] OPTICAL WAVEGUIDE TUBE AND METHOD OF MAKING

[75] Inventors: Hideo Sugiyama, Higashimurayama; Masato Sugimachi; Masato Yoshikawa, both of Kodaira; Minoru Ishiharada, Urawa; Itsuo Tanuma, Sayama; Kazuo Naito, Kawasaki; Atsushi Hotta, Higashikurume, all of Japan

[73] Assignee: Bridgestone Corporation, Tokyo, Japan

[21] Appl. No.: 576,337

[22] Filed: Dec. 21, 1995

[30] Foreign Application Priority Data

Dec. 22, 1994 [JP] Japan .................................. 6-335887
Dec. 27, 1994 [JP] Japan .................................. 6-338008
Dec. 27, 1994 [JP] Japan .................................. 6-338009

[51] Int. Cl.$^6$ .................................................. G02B 6/09
[52] U.S. Cl. ................................. 385/143; 264/1.29
[58] Field of Search ........................... 385/140–143, 385/147; 264/1.29, 1.24; 526/245, 329.7, 247

[56] References Cited

U.S. PATENT DOCUMENTS

| | | | |
|---|---|---|---|
| 4,828,359 | 5/1989 | Ueba et al. | 385/143 |
| 4,966,435 | 10/1990 | Matsumoto et al. | 385/143 |
| 5,155,796 | 10/1992 | Oonishi et al. | 385/143 |

*Primary Examiner*—Akm E. Ullah
*Attorney, Agent, or Firm*—Sughrue,Mion,Zinn,Macpeak & Seas, PLLC

[57] ABSTRACT

The invention relates to an optical waveguide tube comprising a tubular cladding filled with a solid core having a higher refractive index than the cladding. In one form, a resin material having a Tg of up to 50° C. and a modulus of elasticity of up to $10^9$ dyne/cm$^2$ is used as the core. In another form, a copolymer of acrylic acid, methacrylic acid or a lower alcohol ester thereof with a higher alkyl (meth) acrylate is used as the core, preferably in combination with a phosphate, aromatic carboxylate, aliphatic carboxylic acid, aliphatic carboxylate or glycol. In a third form, such an optical waveguide tube is prepared by filling a hollow tubular transparent cladding having opposite open ends with a liquid monomeric charge and causing the monomeric charge to polymerize while pressurizing the exposed surfaces of the monomeric charge inwardly from the opposite open ends along an axial direction of the cladding, thereby forming a core within the cladding.

9 Claims, 1 Drawing Sheet

OPTICAL WAVEGUIDE TUBE AND METHOD OF MAKING

BACKGROUND OF THE INVENTION

1. Field of the Invention

This invention relates to an optical waveguide tube comprising a tubular cladding filled with a solid core having a higher refractive index than the cladding. This invention also relates to a method for preparing the same.

2. Prior Art

Optical waveguide tubes comprising a transparent core and a tubular cladding around the core having a lower refractive index than the core have been used in a variety of optical transmission applications. It is routine to increase the diameter of the core in order to effectively transmit a larger amount of light.

Both solid and liquid cores are known. Solid cores, especially plastic single cores are advantageous because of ease of handling, for example, ease of cutting to a desired length.

Most of prior art solid cores are made of polymethyl methacrylate (PMMA). PMMA is more flexible than quartz base glass. Flexibility is maintained when PMMA is formed into fibers. However, rods of PMMA having a diameter of 3 mm or more are very hard and difficult to use as the core of optical waveguide tubes which are required to be flexible and bendable. There is a need for a core material which is fully light transmissive, flexible and easy to deform.

We found that an optical waveguide tube having a solid core of a transparent plastic material can be produced by filling a hollow tubular cladding with a monomer capable of forming a core and causing the monomer to polymerize to form the core integral with the cladding. This method is advantageous in manufacturing efficiency.

Optical waveguide tubes used for decorative display purposes generally have a diameter of about 3 to 100 mm and are as long as about 1 to 100 m. When a monomer is filled in such a long cladding and polymerized in situ, internal defects often occur. That is, bubbles or spaces often form at the interface between the cladding and the core. The adhesion between the cladding and the core is then insufficient and separation can occur at the interface. Also the core often has a cross-sectional shape which is flattened rather than a true circle.

Since such internal defects are detrimental to the light transmission characteristics of optical waveguide tubes, there is a need for a method of preparing an optical waveguide tube without internal defects.

SUMMARY OF THE INVENTION

An object of the invention is to provide an optical waveguide tube of the single core type which is improved in light transmission and flexibility of the core and which is easy to deform.

Another object of the invention is to provide a method for preparing an optical waveguide tube having improved light transmission characteristics in a simple manner without introducing internal defects.

The invention is directed to an optical waveguide tube comprising a tubular cladding filled with a solid core having a higher refractive index than the cladding. We have found that when a core is formed of a transparent resin material having a glass transition temperature of up to 50° C. and a modulus of elasticity of up to $10^9$ dyne/cm$^2$, especially a copolymer of a monomer selected from acrylic acid, methacrylic acid, and lower alcohol esters thereof with another monomer of the general formula (1):

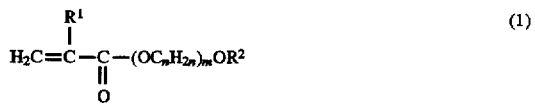

wherein $R^1$ is a hydrogen atom or methyl group, $R^2$ is an alkyl or aryl group, letter n is an integer of 1 to 10, and m is an integer of 1 to 10, that core is fully soft, flexible, and light transmissive and experiences a minimal loss of light transmission with the lapse of time.

We have also found that when a core is formed of a copolymer of a monomer selected from acrylic acid, methacrylic acid, and lower alcohol esters thereof with another monomer of the general formula (2):

wherein $R^1$ is a hydrogen atom or methyl group, $R^3$ is an alkyl group having 8 to 20 carbon atoms, that core is fully soft, flexible, and light transmissive. Although this copolymer is flexible and light transmissive, it tends to absorb moisture and become white turbid in a hot humid environment, resulting in a significant lowering of its transmittance to visible light. By blending the copolymer with a phosphate, aromatic carboxylate, aliphatic carboxylic acid, aliphatic carboxylate, glycol or glycol (meth)acrylate, the copolymer is prevented from turning white turbid when allowed to stand in a hot humid atmosphere. The blend significantly improves the stability of the copolymer and inhibits the copolymer from lowering transmittance over a long period of service.

We have further found that an optical waveguide tube can be prepared by filling a hollow tubular transparent cladding having opposite open ends with a monomeric charge capable of forming a transparent polymer having a higher refractive index than the cladding and causing the monomeric charge to polymerize to form a core within the cladding. The monomer charge is introduced into the tubular cladding with its opposite ends positioned vertically upward and kept open such that the monomeric charge may define exposed surfaces near the opposite open ends of the cladding. The monomeric charge is polymerized while pressurizing the exposed surfaces of the monomeric charge inwardly from the opposite open ends along an axial direction of the cladding, for example, by feeding an inert gas such as nitrogen gas under pressure into an upper space defined in the tubular cladding at each end and above the surface of the monomeric charge. There is obtained a long optical waveguide tube free of internal defects such as bubble spaces.

More particularly, when a tube is prepared by filling a hollow tubular transparent cladding with a monomeric charge and polymerizing the monomeric charge, there arise problems including bubble spaces at the interface between the polymer and the cladding, interfacial separation, and poor adhesion. These problems are attributable to polymerization shrinkage of the monomeric charge. The polymerization shrinkage or volume shrinkage of the monomer charge can be compensated for by pressurizing the exposed surfaces of the monomeric charge inwardly along an axial direction of the cladding. As a result, creation of bubble spaces and interfacial separation are avoided. An optical waveguide tube free of internal defects can thus be produced.

Japanese Patent Application Kokai No. 168028/1995 assigned to the same assignee as the present invention discloses a method for preparing an optical waveguide tube by filling a hollow tubular transparent cladding having one open end and an opposite closed end with a monomer capable of forming a transparent polymer having a higher refractive index than the cladding and polymerizing the monomer while pressurizing the surface of the monomer in an axial direction of the cladding. This method is satisfactory as long as the cladding to be filled with the monomer is short. If the cladding is long, defects can occur at the closed end or bottom side. The present invention intends to overcome the problem of this preceding application. Since the monomeric charge is pressurized from opposite sides rather than one side, the pressuring force applied to the monomeric charge is uniform over its entire region as compared with the pressurizing from one side. Provided that the pressure force is identical, pressurizing from opposite sides is effective for preventing defects from occurring in the core even when the cladding is long.

Therefore, the present invention provides an optical waveguide tube comprising a tubular cladding filled with a solid core having a higher refractive index than the cladding. In a first aspect, the core is comprised of a resin material having a glass transition temperature of up to 50° C. and a modulus of elasticity of up to $10^9$ dyne/cm$^2$.

In a second aspect, the core is comprised of a copolymer of acrylic acid, methacrylic acid or a lower alcohol ester thereof with a monomer of formula (2), preferably a blend of the copolymer with a phosphate, aromatic carboxylate, aliphatic carboxylic acid, aliphatic carboxylate or glycol.

In a third aspect, the present invention provides a method for preparing an optical waveguide tube comprising the steps of filling a hollow tubular transparent cladding having opposite open ends with a liquid monomeric charge capable of forming a transparent polymer having a higher refractive index than the cladding such that the monomeric charge may define exposed surfaces near the opposite open ends of the cladding, and causing the monomeric charge to polymerize while pressurizing the exposed surfaces of the monomeric charge inwardly from the opposite open ends along an axial direction of the cladding, thereby forming a core within the cladding.

BRIEF DESCRIPTION OF THE DRAWINGS

These and further features of the present invention will be apparent with reference to the following description and drawings, wherein.

DETAILED DESCRIPTION OF THE INVENTION

Figure 1:
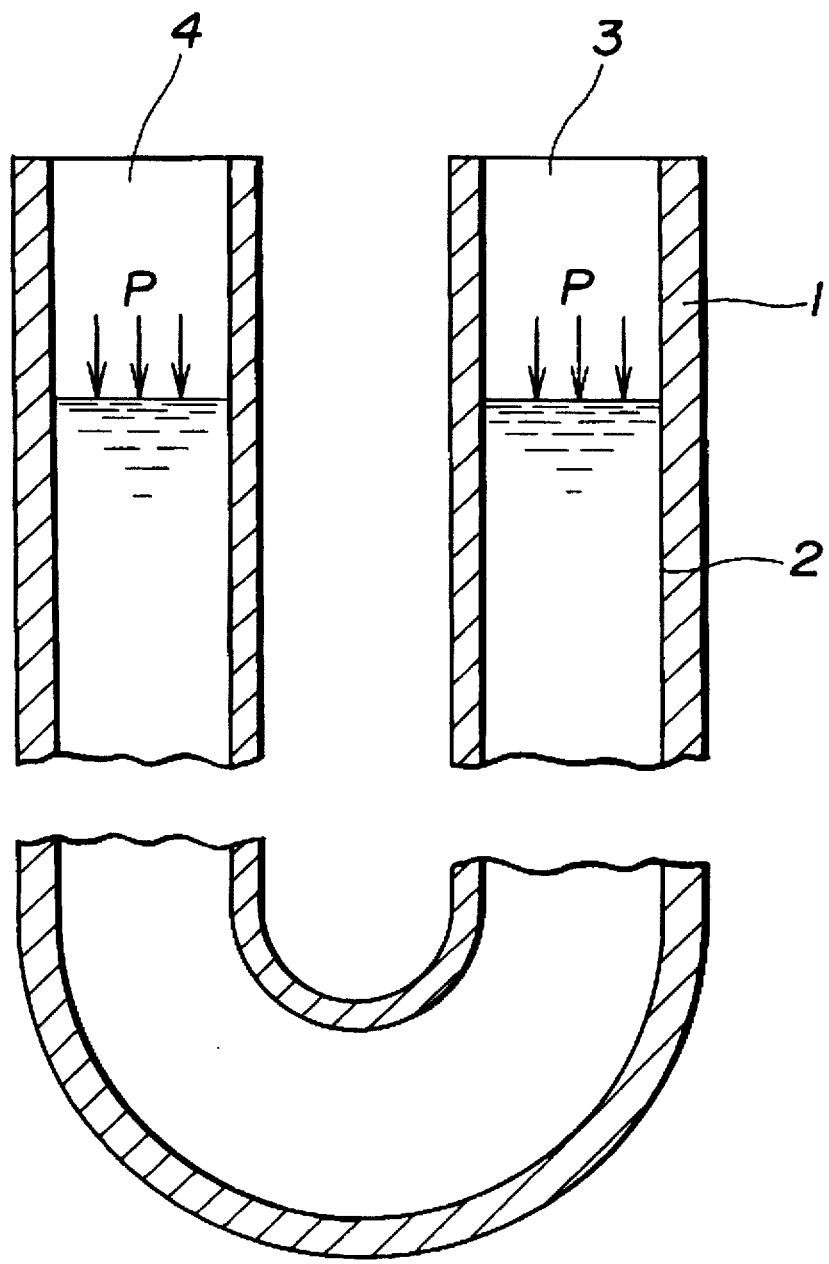
FIG. 1 is a schematic cross-sectional view showing the step of pressurizing a monomer charge in a cladding from opposite ends according to the method of the invention.

In the first aspect, a resin material having a glass transition temperature of up to 50° C., preferably up to 30° C. and a modulus of elasticity of up to $10^9$ dyne/cm$^2$ at 20° C., preferably up to $5\times10^8$ dyne/cm$^2$ at 20° C. is used as the core material. Cores made of resins having a glass transition temperature of higher than 50° C. are too hard to deform at room temperature (20° C.) when their outer diameter exceeds about 4.5 mm and it is then difficult to install an optical waveguide tube along a complex route. Cores made of resins having a modulus of elasticity in excess of $10^9$ dyne/cm$^2$ are very difficult to deform when their outer diameter exceeds about 4.5 mm and some are broken upon bending.

Preferred among these transparent resin materials are copolymers of a first monomer selected from the group consisting of acrylic acid, methacrylic acid, and an ester thereof with a lower alcohol (preferably having 1 to 5 carbon atoms, more preferably 1 to 3 carbon atoms, most preferably 1 carbon atom, that is, methanol) and a second monomer of the general formula (1):

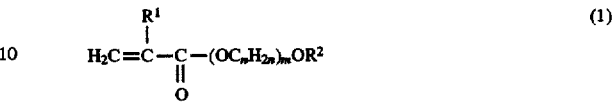

wherein R$^1$ is a hydrogen atom or methyl group, R$^2$ is an alkyl or aryl group, letter n is an integer of 1 to 10, and m is an integer of 1 to 10. The alkyl group represented by R$^2$ preferably has 1 to 5 carbon atoms, more preferably 1 to 3 carbon atoms, and is most preferably methyl. The aryl group is typically phenyl.

Preferred copolymers are copolymers of methyl (meth)acrylate with 2-methoxyethyl (meth)acrylate and copolymers of methyl (meth)acrylate with phenoxypolyethylene glycol (meth)acrylate.

On copolymerization, the proportion of the first monomer, typically methyl(meth)acrylate to the second monomer of formula (1) may be properly determined although the proportion preferably ranges from 5:95 to 75:25, more preferably from 30:70 to 65:35 in weight ratio.

In the second aspect, a copolymer of a monomer selected from the group consisting of acrylic acid, methacrylic acid, and an ester thereof with a lower alcohol (preferably having 1 to 5 carbon atoms, more preferably 1 to 3 carbon atoms, most preferably 1 carbon atom, that is, methanol) and a higher alkyl (meth)acrylate is used as the core material. The higher alkyl (meth)acrylate is of the general formula (2):

wherein R$^1$ is a hydrogen atom or methyl group, R$^3$ is an alkyl group having 8 to 20 carbon atoms. The higher alkyl group represented by R$^3$ has 8 to 20 carbon atoms, preferably 10 to 16 carbon atoms, more preferably 12 to 14 carbon atoms. R$^3$ may be either a single alkyl group or a mixture of alkyl groups, preferably a mixture of alkyl groups having 12 and 13 carbon atoms. The mixture preferably consists of a C12 alkyl group and a C13 alkyl group in a weight ratio of from 20:80 to 80:20, more preferably from 40:60 to 60:40.

In the practice of the invention, copolymers of methyl (meth)acrylate with a monomer of formula (2) wherein R$^3$ is a mixture of alkyl groups having 12 and 13 carbon atoms are especially preferred.

On copolymerization, the proportion of the monomer selected from acrylic acid, methacrylic acid, and lower alcohol esters thereof to the monomer of formula (2) may be properly determined although the proportion preferably ranges from 5:95 to 75:25, more preferably from 30:70 to 65:35 in weight ratio.

Better results are obtained when the copolymers have a modulus of elasticity of $5\times10^7$ to $5\times10^9$ dyne/cm$^2$ at room temperature (30° C.).

In the practice of the invention, the above-defined copolymer is preferably used in combination with at least one additive selected from the group consisting of a phosphate ester, aromatic carboxylate ester, aliphatic carboxylic acid, aliphatic carboxylate ester, glycol, and glycol (meth)acrylate. The additive prevents the copolymer from becoming white turbid when it is allowed to stand for a long time in a hot humid environment.

The phosphates used herein are preferably of the following formula (3):

wherein $R^4$, which may be identical or different, is a substituted or unsubstituted monovalent hydrocarbon group having 1 to 17 carbon atoms, preferably 3 to 10 carbon atoms. Exemplary of $R^4$ are alkyl groups having 1 to 8 carbon atoms, halo-substituted alkyl groups, aryl groups having 6 to 18 carbon atoms, especially 6 to 12 carbon atoms, and halo- or hydroxy-substituted aryl groups. Examples of the phosphate include tributyl phosphate, tri-2-ethylhexyl phosphate, trioctyl phosphate, and 2-ethylhexyldiphenyl phosphate.

The aromatic carboxylates used herein are preferably phthalates of the following formula (4):

wherein $R^5$ is an alkyl group having 1 to 12 carbon atoms, especially 4 to 8 carbon atoms. Exemplary are diethyl phthalate, dibutyl phthalate, and di-2-ethylhexyl phthalate.

The aliphatic carboxylic acids are preferably monocarboxylic acids having 2 to 16 carbon atoms, especially 4 to 10 carbon atoms, for example, acetic acid, propionic acid, n-lactic acid, iso-lactic acid, n-valeric acid, trimethylacetic acid, caproic acid, n-heptanoic acid, capric acid, and pelargonic acid.

The aliphatic carboxylates used herein are preferably esters of the above-mentioned monocarboxylic acids with monohydric alcohols having 1 to 16 carbon atoms, especially 4 to 12 carbon atoms, and dicarboxylates of the following formula (5):

wherein $R^6$ is an alkyl group having 1 to 10 carbon atoms, especially 4 to 8 carbon atoms, and letter n is a number of 1 to 10, especially 2 to 6. Examples of the dicarboxylate include dibutyl adipate, di-2-ethylhexyl adipate, dibutyl sebacate, and di-2-ethylhexyl sebacate.

The glycols include ethylene glycol, propylene glycol, and polyethylene glycols and polypropylene glycols having a degree of polymerization of 2 to 50, especially 2 to 20.

The glycol (meth)acrylates are esters of a glycol including ones exemplified as above with (meth)acrylic acid. The esters may be monoesters in which a OH group of the glycol at one end is esterified with (meth)acrylic acid or diesters in which two OH groups of the glycol at both ends are esterified with (meth)acrylic acid. Examples of the glycol (meth)acrylates include 2-hydroxyethyl (meth)acrylate and polyethylene glycol (meth)acrylate of the following formula (6):

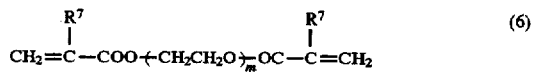

wherein $R^7$ is a hydrogen atom or methyl group and m is an integer of 4 to 23, preferably 4 to 14.

These additives including phosphates, aromatic carboxylates, aliphatic carboxylic acids, aliphatic carboxylates, glycols and glycol (meth)acrylate may be used alone or in admixture of two or more. They are preferably blended in amounts of 2 to 60 parts, more preferably 5 to 30 parts by weight per 100 parts by weight of the copolymer.

The additive is blended with the copolymer preferably by adding it to the polymerization system for preparing the copolymer. Then the additive is uniformly blended in the copolymer.

According to the present invention, an optical waveguide tube includes a tubular transparent cladding and a solid core encased therein. The core has a higher refractive index than the cladding. The core is made of the transparent resin material mentioned above in the first and second aspects. The tubular cladding is preferably made of plastic and elastomeric materials which are flexible, moldable into tubing, and have a relatively low refractive index. Exemplary cladding materials include polyethylene, polypropylene, polyamide, polystyrene, ABS, polymethyl methacrylate, polycarbonate, polyvinyl chloride, polyvinylidene chloride, polyvinyl acetate, ethylene-vinyl acetate copolymers, polyvinyl alcohol, ethylene-vinyl alcohol copolymers, fluoro-resins, silicone resins, natural rubber, polyisoprene rubber, polybutadiene rubber, styrenebutadiene copolymers, butyl rubber, halogenated butyl rubber, chloroprene rubber, acryl rubber, EPDM, acrylonitrile-butadiene copolymers, fluoro-rubber, and silicone rubber.

Preferred among others are silicone polymers and fluorinated polymers having a low refractive index. Examples include silicone polymers such as polydimethylsiloxane polymers, polymethylphenylsiloxane polymers, and fluoro-silicone polymers; polytetrafluoroethylene (PTFE), tetrafluoroethylene-hexafluoropropylene copolymers (FEP), tetrafluoroethylene-perfluoroalkoxyethylene copolymers (PFE), polychlorotrifluoroethylene (PCTFE), tetrafluoroethylene-ethylene copolymer (ETFE), polyvinylidene fluoride, polyvinyl fluoride, vinylidene fluoride-trifluorochloroethylene copolymers, vinylidene fluoride-hexafluoropropylene copolymers, vinylidene fluoride-hexafluoropropylene-tetrafluoroethylene terpolymers, tetrafluoroethylenepropylene rubber, and fluorinated thermoplastic elastomers.

In a third aspect, an optical waveguide tube is prepared by filling a hollow tubular transparent cladding having opposite open ends with a monomeric charge capable of forming a transparent polymer having a higher refractive index than the cladding and causing the monomeric charge to polymerize, thereby forming a core within the cladding. This method results in an optical waveguide tube in which the core is integrated with the cladding. It is preferred that the optical waveguide tubes of the first and second aspects be prepared by this method.

The cladding is preferably made of plastic and elastomeric materials which are flexible, moldable into tubing, and have a relatively low refractive index. Their examples are as mentioned just above. The cladding materials may be used alone or in admixture of two or more. The cladding may be a single tube or a multiple tube. Only the inner surface of the cladding to be in contact with the core may be treated, for example, by coating or smoothing by a double extrusion technique.

Usually, the cladding has an outer diameter of about 3 to 110 mm, an inner diameter of about 2 to 100 mm, and a length of about 1 to 100 m.

The monomeric charge which is filled in the cladding and polymerized in situ to form a core is not particularly limited insofar as it can form a copolymer having a higher refractive index than the cladding. From the standpoints of transparency and adhesion to the cladding, one or more of (meth)

acrylic acid and (meth)acrylates are preferably used to form a homopolymer or copolymer. The (meth)acrylates used herein are preferably esters of (meth)acrylic acid with alcohols having 1 to 18 carbon atoms, especially 1 to 13 carbon atoms. Examples of the useful monomer include (meth) acrylic acid, 2-hydroxyethyl (meth)acrylate, 2-hydroxypropyl (meth)acrylate, 2-methoxyethyl (meth) acrylate, methoxypolyethylene glycol (meth)acrylate, phenoxypolyethylene glycol (meth)acrylate, cyclohexyl (meth) acrylate, benzyl (meth)acrylate, dimethylaminoethyl (meth) acrylate, and glycidyl (meth)acrylate while those exemplified in the first and second aspects are preferred among others.

Such monomers may be polymerized by well-known techniquse. A suitable technique may be selected in accordance with a particular type of monomer. Where (meth) acrylic acid and (meth)acrylates are to be polymerized, one useful technique is to carry out polymerization at about 50° to 120° C. for about 1 to 20 hours using a polymerization initiator. The initiators include organic peroxides such as t-butylhydroperoxide, di-t-butyl peroxide, lauroyl peroxide, benzoyl peroxide, dimyristylperoxydicarbonate, t-butylperoxyacetate, t-butylperoxy(2-ethylhexanoate), and cumylperoxyoctoate, and azo compounds such as azobisisobutyronitrile and azobiscyclohexanenitrile.

In the practice of the invention, polymerization of the monomeric charge is carried out as shown in FIG. 1. A tubular cladding 1 having opposite open ends 3 and 4 is filled with a liquid monomeric charge 2. At this point, the opposite ends 3 and 4 of the cladding 1 are positioned vertically above the remainder such that the monomeric charge may define exposed surfaces near the opposite open ends 3 and 4 of the cladding 1. The monomeric charge is then caused to polymerize while pressurizing the exposed surfaces of the monomeric charge 2 inwardly from the opposite open ends 3 and 4 along an axial direction of the cladding 1 as shown by arrows P, thereby forming a core within the cladding.

The pressure applied to the surface of the monomeric charge is preferably 2 to 10 kg/cm², especially 3 to 5 kg/cm². Pressures below 2 kg/cm² would be less effective for the pressurizing purpose. Some claddings can not tolerate pressures of more than 5 kg/cm².

Preferably the monomeric charge is pressurized by way of a gas. One exemplary procedure is described below. After a hollow tubular cladding is filled with a monomeric charge, an upper space or plenum is defined in the tubular cladding at each end and above the surface of the monomeric charge. A hose at one end is connected to a vacuum pump and an inert gas supply (e.g., a gas tank or pump) through a change-over valve and at another end is connected to the open end of the cladding. Air remaining in the upper space in the cladding is evacuated by actuating the vacuum pump. Then an inert gas such as nitrogen gas under pressure is fed to the space by actuating the gas supply. At this point, the cladding is heated to carry out polymerization of the monomeric charge. By purging the space in the cladding at each end and above the surface of the monomeric charge with inert gas and effecting polymerization of the monomeric charge under pressure in the inert gas atmosphere, there is obtained another advantage of avoiding inhibition of polymerization reaction in the presence of oxygen.

The pressurizing means is not limited to the use of gas. The pressure applied to the monomeric charge need not be kept constant during polymerization reaction. Depending on a particular type of monomer, a pressurizing schedule of applying a low pressure initially and increasing the pressure with the progress of polymerization or vice versa may be used. Especially the former techniques is preferred.

A sealing plug may be used to temporarily close one open end of the cladding when the monomeric charge is introduced into the cladding and to close the open ends of the cladding at the end of monomer polymerization. Where transparency is necessary, the sealing plug is formed of transparent materials such as quartz glass, multicomponent glass, sapphire, rock crystal, polyethylene, polypropylene, ABS resin, acrylonitrile-styrene copolymers, styrene-butadiene copolymers, styrene-butadiene copolymers, acrylonitrile-EPDM-styrene terpolymers, styrene-methyl methacrylate copolymers, methacrylic resins, epoxy resins, polymethyl pentene, allyl diglycol carbonate resins, spiran resins, amorphous polyolefins, polycarbonates, polyamides, polyallylates, polysulfones, polyallylsulfones, polyethersulfones, polyetherimides, polyimides, polyethylene terephthalate, diallyl phthalate, fluoro-resins, polyester carbonates, and silicone resins. Among these, inorganic glass materials such as quartz glass, Pyrex® glass, and multicomponent glass are favorable because of transparency, heat resistance, and chemical stability.

Where transparency is not necessary, the sealing plug may be formed of metals and ceramic materials as well as the above-mentioned transparent materials. In this case, the sealing plug at its surface in contact with the core is polished or provided with a reflecting film in order to reflect light at the sealing plug for increasing light emission from the side surface of the tube.

The thus prepared optical waveguide tube is free of internal defects such as bubble voids and interfacial separation since the core is formed integral with the cladding. The tube thus has improved light transmission capability and finds use in decorative lighting, underwater lighting, lighting for explosive atmosphere and display lighting.

EXAMPLE

Examples of the present invention are given below by way of illustration and not by way of limitation.

Example 1 & Comparative Example 1

A tube of tetrafluoroethylene-hexafluoropropylene copolymer (FEP) having a diameter of 6 mm was filled with a monomeric charge as shown in Table 1. Using a peroxide polymerization initiator, the monomeric charge was polymerized at 70° C. for 3 hours to form a core in situ. The tube was cut to a section of 50 cm long, which was manually bent for evaluating ease of deformation. The tube section was rated "NG" when it was broken by bending 45° and "OK" when it could be bent 45° without breakage.

The core was measured for glass transition temperature (Tg), modulus of elasticity, and transmittance of 670-nm visible light. Tg was measured by differential scanning calorimetry at a heating rate of 5° C./min. Modulus of elasticity (viscoelasticity by rheometry) was measured at 20° C. by means of Rheometrix with frequency 10 Hz and strain 2%.

The results are shown in Table 1.

TABLE 1

| Monomer (weight ratio) | Bending | Tg (°C.) | Elasticity (dyne/cm²) | Transmittance (%) |
|---|---|---|---|---|
| MA (100) | NG | 116 | $1 \times 10^{10}$ | 85 |
| MA/M1 | OK | 16 | $4 \times 10^{7}$ | 78 |
| MA/M2 | OK | −4 | $2 \times 10^{8}$ | 83 |

MA: methyl acrylate
M1: 2-methoxyethyl acrylate
M2: phenoxyethylene glycol acrylate Example 2 & Comparative Example 2

A tube of tetrafluoroethylene-hexafluoropropylene copolymer (FEP) having a diameter of 13 mm was filled with a monomeric charge as shown in Table 2. Using a peroxide polymerization initiator, the monomer was polymerized at 70° C. for 3 hours to form a core in situ. The tube was cut to a section of 50 cm long, which was manually bent for evaluating ease of deformation. The core was measured for modulus of elasticity at 20° C. and transmittance of 670-nm visible light. Evaluation is the same as in Example 1. The results are shown in Table 2.

TABLE 2

| Monomer (weight ratio) | Bending | Tg (°C.) | Elasticity (dyne/cm²) | Transmittance (%) |
|---|---|---|---|---|
| MMA (100) | NG | 118 | $8 \times 10^{9}$ | 87 |
| MMA/SLMA (70/30) | OK | 8 | $8 \times 10^{8}$ | 85 |
| MMA/SLMA (50/50) | OK | 4 | $5 \times 10^{8}$ | 84 |
| MMA/SLMA (30/70) | OK | 1 | $1 \times 10^{8}$ | 84 |

MMA: methyl methacrylate
SLMA: higher alkyl (mixed C12/C13 alkyl) methacrylate

Example 3

MMA and SLMA were mixed in a weight ratio of 50:50. To 100 parts by weight of the MMA/SLMA mixture were added 20 parts by weight of an additive and 0.5 part by weight of peroxide. The additive used herein was tributyl phosphate (TBP), trioctyl phosphate (TOP), diethyl phthalate (DEP), dibutyl adipate (DBA), n-heptanoic acid or propylene glycol (PG), 2-hydroxyethyl methacrylate (HO) or polyethylene glycol dimethacrylate (9G) [in formula (6), m=9]. The resulting monomeric charge was introduced into a FEP tube having a diameter of 6 mm and heated at 75° C. for 3 hours for polymerization. The tube was cut to a section of 50 cm long. The tube section was measured for transmittance of 670-nm visible light both before and after it was allowed to stand for 240 hours in an atmosphere of temperature 60° C. and relative humidity 90%. The results are shown in Table 3.

TABLE 3

| Additive | Transmittance (%) | |
|---|---|---|
| | Initial | After hot humid storage |
| — | 86 | 15 |
| TBP | 85 | 82 |
| TOP | 85 | 81 |
| DEP | 83 | 76 |

TABLE 3-continued

| Additive | Transmittance (%) | |
|---|---|---|
| | Initial | After hot humid storage |
| DBA | 84 | 78 |
| n-heptanoic acid | 84 | 82 |
| PG | 81 | 75 |
| HO | 85 | 81 |
| 9G | 84 | 82 |

It is evident from Table 3 that although the copolymer without the additive becomes white turbid in a hot humid atmosphere and undergoes a marked lowering of visible light transmittance, the use of the additive prevents the copolymer from becoming white turbid. In particular, phosphate additives are effective.

The optical waveguide tubes of Examples 1 to 3 are soft and flexible enough to be bent without breakage and highly transmissive to light. They perform well as a single core type light tube.

Example 4

A tube of tetrafluoroethylene-hexafluoropropylene copolymer (FEP) having an outer diameter of 13 mm, an inner diameter of 12 mm, and a length of 12 m was used. The tube was charged with a liquid monomeric charge containing 30 parts by weight of methyl methacrylate, 70 parts by weight of lauryl methacrylate, and 0.8 part by weight of lauroyl peroxide until the surface of the monomeric charge reached 10 cm below each open end of the tube. Nitrogen gas under a pressure of 3 kgf/cm² was fed to the spaces above the liquid surface from the open ends of the tube for pressurizing the exposed surfaces of the monomeric charge. The tube was kept for 2 hours in a water bath at 80° C. to effect polymerization. An waveguide tube of 10 m long was obtained. The tube was free of interfacial separation between the core and the cladding and the core was free of defects.

Comparative Example 3

A FEP tube as used in Example 4 was closed at one open end. With the other open end upward, the tube was charged with a monomeric charge as used in Example 4 until the surface of the monomeric charge reached 20 cm below the other open end of the tube. Nitrogen gas under a pressure of 3 kgf/cm² was fed from the open end of the tube for pressurizing the exposed surface of the monomeric charge. Polymerization was effected as in Example 4. An optical waveguide tube of 10 m long was obtained. The tube was free of defects in a section extending about 5 m from the pressurized side end. In the remaining section of 5 to 10 m where the effect of pressure was less, defects including interfacial separation between the core and the cladding and flattening of the core were found.

Since the method of the invention allows a monomeric charge to polymerize in a cladding without bubble voids and separation at the interface between the core and the cladding, an optical waveguide tube free of internal defects and having improved light transmission capability can be produced in a simple manner.

Although some preferred embodiments have been described, many modifications and variations may be made thereto in the light of the above teachings. It is therefore to be understood that within the scope of the appended claims, the invention may be practiced otherwise than as specifically described.

We claim:

1. An optical waveguide tube comprising; a tubular cladding filled with a solid core having a higher refractive index than the cladding, said core comprising a resin material having a glass transition temperature of up to 50° C. and a modulus of elasticity of up to $10^9$ dyne/cm$^2$, wherein said resin material is a copolymer of a monomer selected from the group consisting of acrylic acid, methacrylic acid, and lower alcohol esters thereof with a monomer of the general formula (1):

(1)

wherein $R^1$ is a hydrogen atom or methyl group, $R^2$ is an alkyl or aryl group, letter n is an integer of 1 to 10, and m is an integer of 1 to 10.

2. The optical waveguide tube of claim 1 wherein said copolymer is a copolymer of methyl (meth)acrylate with 2-methoxyethyl (meth)acrylate or phenoxypolyethylene glycol (meth)acrylate.

3. An optical waveguide tube comprising a tubular cladding filled with a solid core having a higher refractive index than the cladding, said core comprising a copolymer of a monomer selected from the group consisting of acrylic acid, methacrylic acid, and lower alcohol esters thereof with a monomer of the general formula (2):

(2)

wherein $R^1$ is a hydrogen atom or methyl group, $R^3$ is an alkyl group having 8 to 20 carbon atoms.

4. The optical waveguide tube of claim 3 wherein said copolymer is a copolymer of methyl (meth)acrylate with a monomer of formula (2) wherein R is a mixture of alkyl groups having 12 and 13 carbon atoms.

5. The optical waveguide tube of claim 3 wherein said core is formed of a blend of said copolymer with at least one member selected from the group consisting of a phosphate, aromatic carboxylate, aliphatic carboxylic acid, aliphatic carboxylate, glycol, and glycol (meth)acrylate.

6. A method for preparing an optical waveguide tube comprising the steps of:

filling a hollow tubular transparent cladding having opposite open ends with a liquid monomeric charge capable of forming a transparent polymer having a higher refractive index than the cladding such that the monomeric charge may define exposed surfaces near the opposite open ends of said cladding, and causing the monomeric charge to polymerize while pressurizing the exposed surfaces of the monomeric charge inwardly from the opposite open ends along an axial direction of said cladding, thereby forming a core within said cladding.

7. The method of claim 6 wherein the pressuring step includes feeding an inert gas under pressure into upper spaces defined in the tubular cladding at the opposite ends and above the surfaces of the monomeric charge for purging the upper spaces with the inert gas and pressuring the monomeric charge.

8. The method of claim 6 wherein the monomer is a mixture of a monomer selected from the group consisting of acrylic acid, methacrylic acid, and lower alcohol esters thereof with a monomer of the general formula (2):

(2)

wherein $R^1$ is a hydrogen atom or methyl group, $R^3$ is an alkyl group having 8 to 20 carbon atoms.

9. The method of claim 8 wherein at least one member selected from the group consisting of a phosphate, aromatic carboxylate, aliphatic carboxylic acid, aliphatic carboxylate, glycol, and glycol (meth)acrylate is added to the monomer mixture.

* * * * *